United States Patent [19]

Reilly et al.

[11] 4,189,675
[45] Feb. 19, 1980

[54] SATELLITE PERSONAL COMMUNICATIONS SYSTEM

[76] Inventors: Robert A. Frosch, Administrator of the National Aeronautics and Space Administration, with respect to an invention of Norman B. Reilly, Glendale; Joel G. Smith, La Canada, both of Calif.

[21] Appl. No.: 910,707

[22] Filed: May 30, 1978

[51] Int. Cl.² .............................................. H04B 7/20
[52] U.S. Cl. ......................................... 325/4; 325/8; 325/9; 325/14
[58] Field of Search ......................... 325/4, 14, 5, 8, 9; 179/15 BS, 15 BY, , 16 E; 343/100 SA

[56] References Cited

U.S. PATENT DOCUMENTS

| 3,710,255 | 1/1973 | Gicca | 325/14 |
| 3,711,855 | 1/1973 | Schmidt | 343/100 SA |
| 3,842,350 | 10/1974 | Gross | 325/4 |
| 3,928,804 | 12/1975 | Schmidt | 325/14 |
| 4,004,098 | 1/1977 | Shimasaki | 325/4 |

Primary Examiner—Robert L. Griffin
Assistant Examiner—Michael A. Masinick
Attorney, Agent, or Firm—Monte F. Mott; John R. Manning; Paul F. McCaul

[57] ABSTRACT

A communication system is described for providing voice channel communication between any of many thousands of moderate cost and low power mobile stations dispersed over a large area such as the continental United States, and which is especially useful for connecting users who are primarily stationed in rural areas that cannot be economically served by trunk dispatch mobile networks. The system includes a geostationary satellite utilizing a large UHF antenna that can receive a transmission from a caller and retransmit it over any one beam of a matrix of narrow beams, so the chosen beam covers an area in which a designated called party is located. A single up-link control channel occupying a narrow frequency band, can be utilized to receive dial up signals from a caller, and another single down-link control channel can be utilized to ring up the called party located anywhere within the continental United States. The satellite antenna includes a matrix of feed horns that not only direct the beams in a controlled matrix onto the area of the continental United States, but also permit detection of the region from which the caller's signal is transmitted and the region from which the called party's answer is received, to enable the interconnection of signals received from these two regions.

4 Claims, 9 Drawing Figures

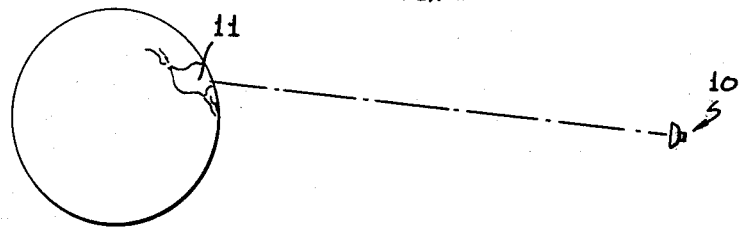
FIG. 1
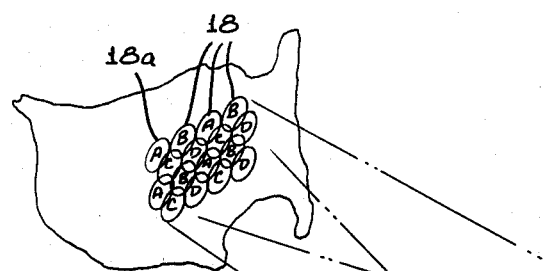
FIG. 2
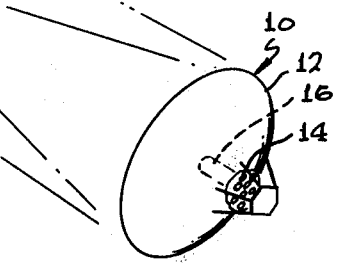
FIG. 3
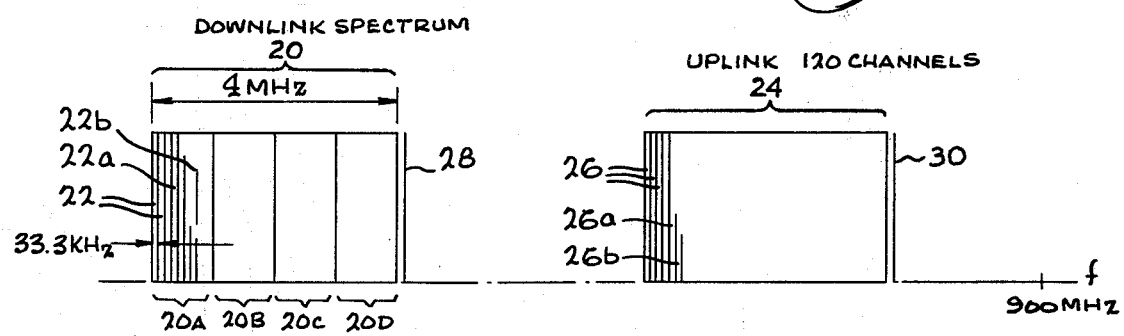
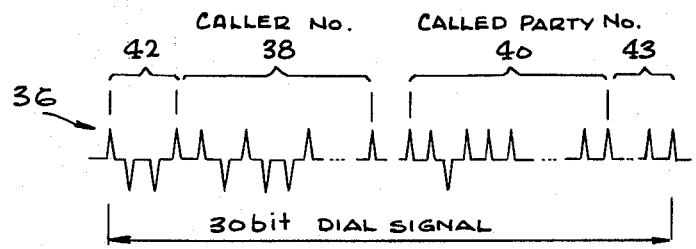
FIG. 4

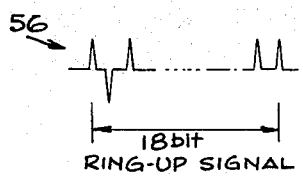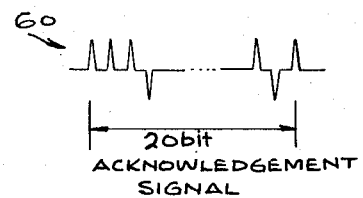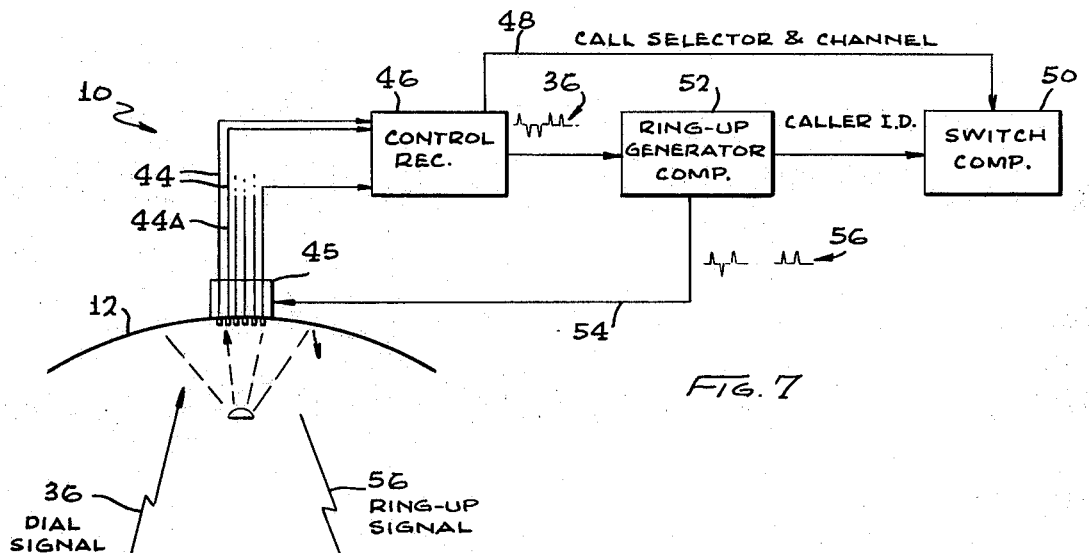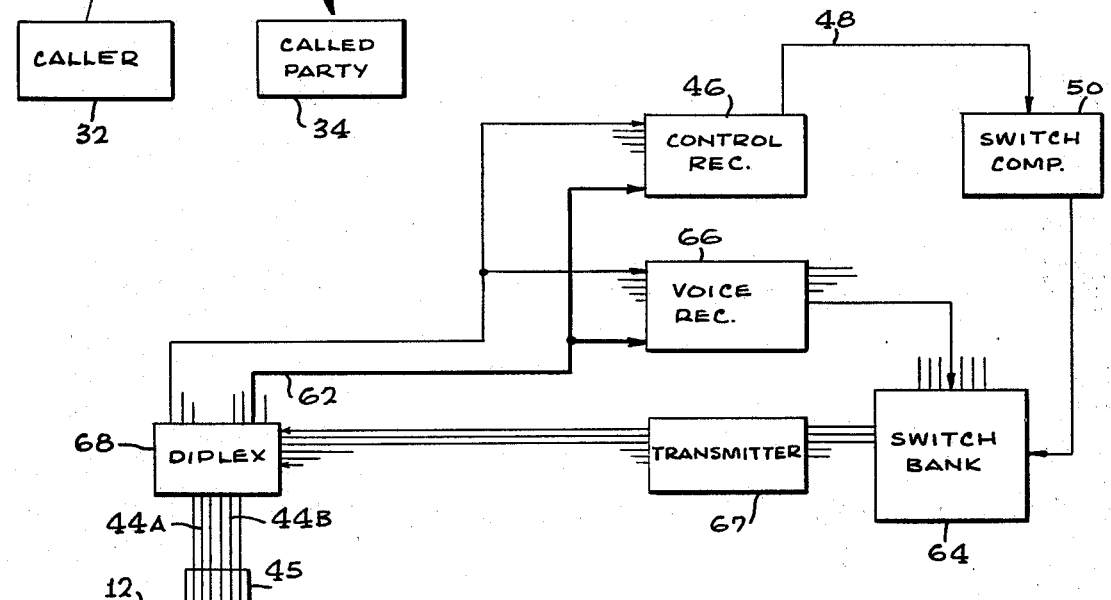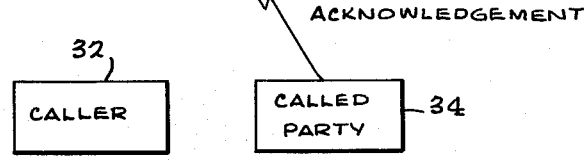

SATELLITE PERSONAL COMMUNICATIONS SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

While urban mobile communications can be economically served by a trunk dispatch mobile network, a similar need for mobile communication in rural areas has not been satisfied. Urban land mobile systems operating in the 850 MHz band normally do not cover an area of more than about 30 miles in diameter. In order to cover the conventional United States, an excessively large number of such stations would be required, which would have to be interconnected to permit communication between mobile units in various areas. The relatively great dispersion of rural mobile units makes such a system uneconomical. A geostationary satellite communication system could be utilized to connect moderate numbers of widely dispersed mobile units, but to be acceptable such a system must occupy only a relatively small portion of the available high frequency spectrum, in spite of the need for communication with perhaps tens of thousands of different units dispersed over a wide area such as the continental United States.

SUMMARY OF THE INVENTION

In accordance with one embodiment of the present invention, a mobile communication system is provided that can be utilized to reliably interconnect large numbers of dispersed mobile units over a wide area such as the continental United States. The system includes a geostationary satellite with a large diameter reflector antenna, with a matrix of feed horns, for transmitting narrow beams that each cover a specific limited area or sector of the United States. The feed horn matrix also enables the detection of the specific sector from which a tranmission is received. This permits the satellite to detect the particular sectors in which a caller and called party are located, and to retransmit signals between them, utilizing narrow beams that do not cover other sectors of the country. Thus, the same frequency band can be utilized in each of many different sectors of the United States, to permit a large number of units to be interconnected utilizing only a moderate band width of the radio frequency spectrum.

In one system, a caller utilizing a small transmitter with a simple whip antenna, transmits a dialing signal which identifies the number of the caller and the number of the called party. By the use of a Butlet matrix connected to the array of feed horns which receive the dialing signal, circuitry on the satellite can determine the sector of the continental United States from which the dialing signal was received. The satellite can then transmit a ring up code throughout the country, which will ring only the particular called unit, which is only one out of tens of thousands of such units, regardless of where, within the country, that unit is located. When the called party responds, the satellite can determine which sector the called party is located in, by use of the same Butler matrix. With the information thus obtained as to the sectors in which the caller and called party are located, plus knowledge as to the channels previously assigned or which are the assigned to the identified caller and called party, the satellite circuitry can thereafter switch all signals received from either party and transmit them to the other party. That is, signals received on a particular channel from a particular sector of the country, which represent signals from the caller, are transmitted over a second predetermined channel contained in a beam directed to a second predetermined sector, and vice versa. Another or the same Butler matrix connected to the feed horn array, is utilized to control signal delivery to the feed horn matrix to produce a narrow beam covering a particular sector.

The novel features of the invention are set forth with particularity in the appended claims. The invention will be best understood from the following description when read in conjunction with the accompanying drawings.

BRIEF DESCRIPTION OF THE DRAWINGS

FIG. 1 is a view showing the relative locations of a geostationary satellite and an area, such as the continental United States, over which the satellite maintains communication between a large number of parties.

FIG. 2 is a perspective view of the system of FIG. 1, showing the manner in which a matrix of signals are transmitted from the satellite to cover a particular area which is the continental United States.

FIG. 3 is a graph showing the frequencies occupied by the radio waves utilized in the system of FIG. 1.

FIG. 4 is a representation of a dial signal which can be transmitted from a mobile unit to initiate a communication with another unit.

FIG. 5 is a ring up signal which can be transmitted from the satellite to ring up a called party.

FIG. 6 represents an acknowledgement signal which can be transmitted from a called party to the satellite.

FIG. 7 is a simplified block diagram of a portion of the system of FIG. 1, showing the initial stages in the establishment of a communication link between a pair of mobile units.

FIG. 8 is a partial block diagram view of the system of FIG. 7, showing the manner in which the intercommunication of a pair of units is conducted.

DESCRIPTION OF THE PREFERRED EMBODIMENT

Figure 9:
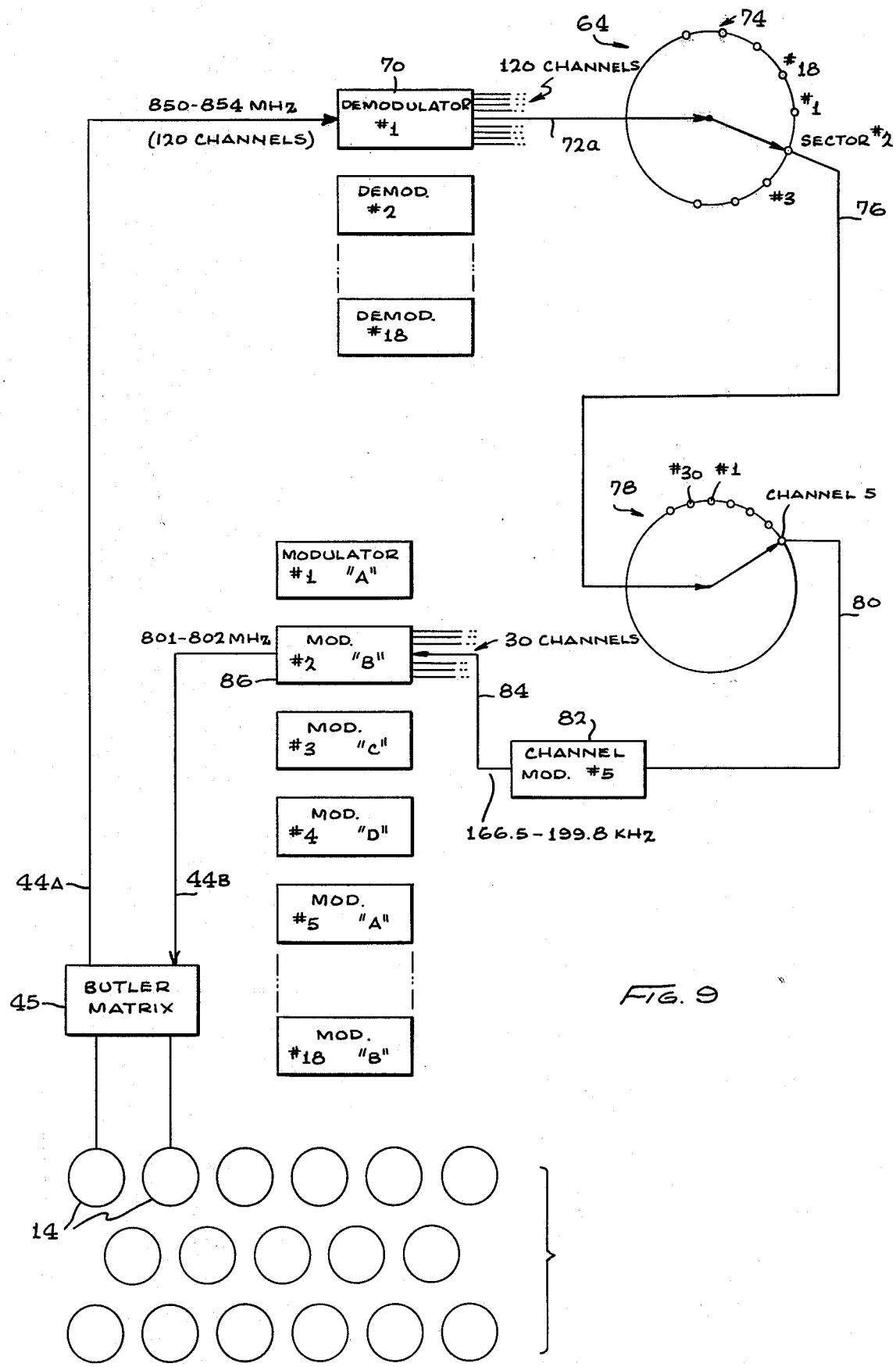
FIG. 9 is a simplified view showing the completion of a communication link between a pair of stations.

FIG. 1 illustrates the manner in which a geostationary satellite 10 can be utilized to establish communication between a large number of stations, many or most of which may be mobile, over an area of the earth such as the continental United States 11. As shown in FIG. 2, the satellite 10 includes a large dish antenna 12 of a diameter such as 50 meters, and a matrix of horns 14 for applying signals to the antenna and receiving signals therefrom, by way of an intermediate reflector 16. The system is designed to operate at a high frequency such as 900 MHz, and the antenna 12 is large enough, that the beams transmitted from the antenna are narrow, subtending an angle such as 0.5°. Beams emitted from the different horns 14 are transmitted by the dish 12 in slightly different directions, to produce a matrix of means that cover a matrix of sectors 18, with the sectors 18 covering the communication area such as the continental United States. Each beam covers a limited land area such as one which is several hundred miles in diameter. Thus, the same frequency band can be utilized in a large number of different sectors, so that a large number of units located in different sectors about the country, can all be communicated with utilizing a relatively limited bandwidth of the radio frequency spectrum. Also, signals originating from a unit located within a particular sector such as 18A, which are received by the antenna dish 12, enable the determination of the sector of the country in which the transmitter is located.

The sectors 18 can be distributed in a matrix such as that shown in FIG. 2, wherein there is some overlap of the circular sectors, to assure that all areas of the country are covered by at least one sector. To prevent interference between adjacent beams that overlap at their edges, each of the beams designated A covers only a limited frequency band, while each of the other three groups of beams B, C and D covers a different frequency band. Thus, by dividing the down link frequency spectrum into at least four portions, and by distributing these portions into a matrix of the type illustrated, each sector of the country can be covered by a beam that avoids interference with adjacent beams. FIG. 3 illustrates a radio frequency spectrum for the system, which includes a down link spectrum 20 occupying a bandwith such as 4 MHz, and which is divided into four downlink spectrum portions 20A, 20B, 20C, and 20D, each of which occupies a band of one MHz. Each spectrum portion such as 20A includes 30 voice channels 22, with each channel 22 occupying a 33.3 kHz bandwidth. Thus, the same spectrum portion such as 20A containing 30 voice channels, can be utilized in many different separated sectors spaced about the country, to minimize the total frequency bandwidth that must be allocated to the communication system.

In addition to the downlink spectrum 20 which is utilized to transmit signals from the satellite to each sector of the country, an additional uplink spectrum 24 is provided, over which voice communication can be made from any unit located in the country to the satellite. Each of the ground units can be allocated a specific uplink channel of 33.3 kHz bandwidth, for sending voice signals from the unit to the satellite. In addition to the uplink and downlink spectrums 20 and 24, a pair of narrow band downlink and uplink control channels 28, 30 are provided, which are utilized in initially establishing communication between a pair of ground stations by way of the satellite.

An understanding of the way in which the communication system can operate to connect a pair of ground units located anywhere within the area covered by the satellite, such as the continental United States, can be best understood by following the establishment of such a connection. As shown in FIG. 7, a connection between a caller 32 and a called party 34, each of which has a radio transmitter-receiver unit, can be initiated by the caller 32 transmitting a dial signal to the satellite 10. The dial signal can comprise a 30-bit binary code of a type such as that shown in FIG. 4. The 30-bit dial signal 36 includes a first portion 38 representing the number of the caller, such as caller number "5,001" in a system of 13,000 total units scattered about the country. A second portion 40 of the dial signal 36, represents the number of the called party, such as party number "8,030." Additional portions 42, 43 of the dial signal can represent any additional information that must be transmitted.

In FIG. 7, the dial signal 36 is transmitted from the caller to the antenna 12. The signal reaching the antenna reflector 12, is reflected by a subreflector to the matrix of feed horns 14. The feed horns 14 are connected to a signal processing means in the form of a Butler matrix 45 which has a group of output lines or ports 44. A Butler matrix is a well known type of microwave network made up of 3 dB hybrid junctions and appropriate phase shift circuitry which is capable of performing a transformation. The Butler matrix 45 is constructed so that when a signal from any particular sector of the country, such as sector 18A, is received by the feed horn array with the signals in different horns being in a particular phase and amplitude relationship due to their originating from that sector 18A, the Butler matrix yields an output on only a corresponding port or line 44A. A Butler matrix can be utilized in the reverse manner, to distribute a signal to an array of feed horns with the relative phases and amplitudes of the signals delivered to the different feed horns controlled so that the antenna reflector 12 emits a narrow beam aimed at a particular sector of the country. Thus, the Butler matrix serves as a means for directing, by way of the feed horns, radio waves passing along a narrow beam toward a particular sector of the earth, or originating from a particular sector, to or from a Butler matrix port.

FIG. 7 shows a dial signal received from the caller and delivered through line 44A to a control receiver circuit 46. The control receiver circuit 46 generates a signal over line 48 to a switch computer 50, indicating which of the lines 44 received the signal, to thereby indicate which sector of the country caller 32 is located in. The control receiver 46 also delivers the dial signal 36 to a ring-up generator computer 52. The computer 52 utilizes the called party number portion 40 of the dial signal 36 to chose the corresponding downlink ring up signal, which has been designated on a look-up table for that particular called party whose number is "8,030." The computer 52 then generates a ring up signal which is transmitted over line 54 to the antenna, to a broad beam feed horn thereof, to transmit a ring up signal so it covers the entire country. The ring up signal can be of the type illustrated at 56 in FIG. 5, which comprises an 18 bit binary code representing the number of the called party, number "8,030." This ring up signal will ring a buzzer of only that particular receiver 34 which has been programmed to ring in response to this particular 18 bit number. Thus, the buzzer on the unit of the called party 34 will buzz to indicate that it is being called.

FIG. 8 illustrates a next step in the connection process, wherein the called party 34 transmits an acknowledgment signal 60 to the antenna 12, with the acknowledgement signal being a 20 bit binary signal which includes a portion representing the number "8,030" of the called party. The dish antenna 12 directs the acknowledgement signal into the Butler matrix 45 which has a particular port or line corresponding to the sector of the country in which the called party 34 is located. The Butler matrix transmits the acknowledgement signal along a line 44B through a diplex 68 to the control receiver 46, which delivers another signal over line 48 to the switch computer 50, to indicate the particular sector of the country in which the called party is located. The portion of the acknowledgement signal which represents the identification number "8,030" of the called party, is utilized so that only when the acknowledgement signal representing the called party "8,030" is received, is a corresponding signal delivered over a line 48 indicating that the acknowledgement signal is received from the party "8,030" called by the caller whose number is "5,001."

The switch computer 50 therefore has received signals indicating the number "5,001" of a caller party, the sector such as sector 18A in which the caller party is located, the number "8,030" of the called party, and the sector such as 18B in which the called party is located. The switch computer 50 can utilize the numbers of the caller 32 and called party 34 to determine which of the 30 downlink channels (each channel occupying 33.3 kHz) each of the receivers of the two parties are set to receive. For example, caller "5,001" may be programmed to receive signals only on channel 22a (FIG. 3) while called party "8,030" may be programmed to receive only signals on another downlink channel 22b. The computer can utilize another look-up table to determine which of the up-link channels 26 (each occupying 33.3 kHz) has been allocated (or which the computer will allocate) to the caller 32 and called party 34. For example, called number "5,001" may be allocated up-link channel 26a, while the called party number "8,030" may have been allocated up-link channel 26b. The switch computer 50 can then control a switchbank 64 to make a certain voice channel switch connection between signals received from a voice receiver 66 (which receives the uplink spectrum 24) and lines that are delivered through a transmitter 67, a diplex 68, and the Butler matrix 45 to the feed horns. The switch bank is operated to make a voice channel connection whereby all voice signals received from the caller 32, which are only those voice signals delivered over a Butler matrix line 44A, and which are of the up-link frequency 26a, will be amplified and delivered on the downlink channel 22b through a line 44B to reach the called party 34. Conversely, all signals received from the called party 34, which are those delivered over line 44B and which are of the up-link channel frequency 26b, will be amplified and then retransmitted over downlink channel 22a through line 44A, to reach the called party 32.

FIG. 9 is a block diagram which indicated the manner in which an interconnection can be made by the switch bank 64. The caller is located in sector 18A and therefore signals from him will be detected by the Butler matrix 45 and delivered over line 44A.

The line 44A will deliver all signals received, which includes 120 channels, each of 33.3 kHz bandwidth, all within the uplink spectrum 24, to a demodulator 70, which has 120 output lines 72, each carrying signals of a different one of the uplink channels. The line 72a, which carries the particular uplink channel assigned to the particular caller, is delivered to a switch 74. The switch 74 has been set, by the switch computer, to deliver all inputs to an outlet 76 which represents the called party's sector 18B, which corresponds to Butler matrix line 44B. Accordingly, the outlet 76 is connected to a switch 78 which is devoted to sector 18B. The switch 78 has been set, by the switch computer, to deliver its input to an outlet 80, which represents the particular downlink channel (number 5 in the figure) of the called party. The outlet 80 is connected to a modulator 82 which uses the voice signal to modulate a carrier in a particular frequency band such as 166.5 to 199.8 kHz (which is the fifth lowest of the 30 channels that extend from 0 to 1 MHz). The output from the channel modulator is delivered over line 84 to a sector modulator 86 which receives signals on 30 other lines and uses them to modulate an 801 MHz carrier. The sector modulator 86 delivers a sector signal of the bank 801 to 802 MHz to Butler matrix line 44B, for transmission to sector 18B, for receipt by the called party. The called party's receiver passes only the 166.5 to 199.8 kHz channel on the carrier.

Since each portable transmitter-receiver unit may be located in any one of four groups of sectors A, B, C or D, each transmitter-receiver unit can be constructed to receive signals on a particular channel in each of the downlink bands 20A, 20B, 20C and 20D. The satellite will transmit to that party over a channel such as 22a located in only one of the bands such as 20A. Of course, the party can utilize information as to which sector it is located in, to block reception in the three channels designated for other sectors, to minimize noise reception from unused bands (the corresponding channels in the other bands 20B-20D will not be utilized while a corresponding channel such as 22a in the bank 20A is being utilized).

The dial signal of FIG. 4, the ring up signal of FIG. 5, and the acknowledgement signal of FIG. 6, can all be accommodated in very narrow control channels such as those shown at 28 and 30 in FIG. 3. The dial signal 36 of FIG. 4 and the acknowledgement signal 60 of FIG. 6 may be transmitted from ground stations at unknown times. However, since each signal can be made to last for a very small period such as only several milliseconds, there will be only occasional occurrences of several users in an area dialing up or transmitting an acknowledgement signal at the same time. The fact that each dialing or acknowledgement signal is passed along only one of the Butler matrix lines 44, means that interference can only occur from units transmitting at the same time which are located in the same sector of the country. The ring up signal transmitted by the satellite to the ground, can be allowed to cover the entire country, utilizing a single narrow frequency band, since the satellite can be constructed to transmit all ring up signals in sequence, with no two transmitted at the same time.

It may be noted that in FIG. 3, the down link spectrum 20 and up-link spectrum 24 are separated from one another by a considerable frequency band. This permits the horns 14 on the satellite, to be easily used in double duty for both receiving and transmitting signals, since each received signal will be of a very different frequency from each transmitted signal, and a diplex device can be utilized to separate transmitted from received signals. It may be noted that it is sometimes more efficient to utilize one Butler matrix for receiving signals from the feed horn matrix, and another Butler matrix for delivering signals to the feed horn matrix for transmission. In that case, the diplex would be located between the feed horns and the two Butler matrices.

The number of different sectors into which the communication area, such as the continental United States, can be divided into with a separate antenna beam covering primarily only that sector, depends upon the frequency of the radio waves and the diameter of the dish antenna 12 utilized in the satellite. Currently, four frequency bands have been allocated to land mobile use, these bands near 150 MHz, 450 MHz, 850 MHz, and 1,500 MHz. The higher frequencies permit the production of narrower beams, or beams with sharper sidelobe taper, for dish antennas of given size. Also, the higher frequencies are more immune to disruptions such as from ionospheric reflections. However, the power requirements increase with frequency. One set of calculations has shown that a good compromise frequency is at the 900 MHz band. The cost of the satellite is largely dependent upon the diameter of the dish antenna. Estimates have been made that the largest reasonable reflector size would be 200 meters. Calculations have been made that show that a practical range of beams that could be utilized to cover the continental United States, is between perhaps 8 and 200 beams. In one system that was designed each voice communication channel is assumed to occupy 20 Khz in a narrow bank voice analog FM modulation method, with 33.3 kHz separation between channels. With one MHz bandwidth allocated to each beam, each beam can carry 30 channels (with 33.3 kHz separation between channels). A user occupancy of 4% can be assumed, which would mean that, on the average, 25 users in each sector would be allocated to the same 20 kHz voice channel (though only one at a time can use it). This is at least double the prevailing practice wherein more than 50 users are typically assigned to the same channel in any given area. Thus, with each beam occupying one MHz with 33.3 kHz separation between channels, there would be 30 channels per sector, or, in other words, 750 terminals per sector. Where the number of beams and corresponding sectors, ranges between 8 and 200 to cover the continental United States, the number of users ranges from 6,000 to 150,000.

The ground units or terminals can be of relatively low wattage types, with 1 to 5 watt power transmission. Solid state units can be constructed with front ends of 3 dB or a 575° K. noise temperature. It is estimated that such terminals can be constructed and maintained over a life of several years for under $2,000. per terminal, so that a monthly terminal lease fee of $100.00 can be achieved. The satellite reflector can be of the center fed type (and of a direct fed design or the cassegrain design shown in FIG. 2), or can be of the offset type. It is estimated that a phase array of feed horns 14 in a pattern corresponding to the pattern of sectors 18, would have an average width or height only 10% that of the antenna, and therefore would occupy only about 1% of the antenna area. The cost of a geostationary satellite has been calculated to be on the order of $300 M (million dollars) including about $35 M for a launch into orbit.

Thus, there is described a communication system that can be utilized for permitting voice communication between any of a large number of mobile ground terminals of relatively small size and moderate cost, regardless of the locations of any of the terminals anywhere within a large area such as the continental United States. This can be accomplished by the use of a geostationary satellite which includes an antenna that can detect which one of a large number of sectors of the country from which a signal has been received, and which can transmit a narrow beam to cover any one of a large number of sectors. The satellite therefore can determine the sector in which a caller is located, determine the sector from which the called party has responded, and thereafter detect signals from the particular caller and retransmit them to the particular called party, and vice versa. This permits the same frequency band to be utilized over a large number of different sectors, such as in every fourth sector, so that a limited frequency band can be utilized to interconnect a large number of ground terminals scattered about the communication area such as the continental United States. Initial establishment of communication can be simplified by utilizing a separate limited frequency band for dialing, wherein a caller indicates which party he wishes to call, and in ring up, wherein the satellite broadcasts a signal throughout the country to ring the particular called party.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A communication system for establishing communication between a large number of earth based terminals by means of a satellite, using a limited radio frequency bandwidth, comprising:

a satellite which includes a large reflector, a plurality of signal ports for transmitting and receiving, and means for directing a narrow angle radio wave beam containing signals received from a signal port to one of a multiplicity of sectors on the earth by way of the reflector; and a plurality of terminals located in different of said sectors of the earth;

said satellite including means for delivering signals containing the same radio frequency band to different ones of said ports, so that the same frequency band can be used in different sectors of the earth;

said satellite including means responsive to a signal received from a sector of the earth by one of said ports, for processing the signal and then delivering it to a port for retransmission to a particular sector of the earth;

each of said terminals is responsive to a different coded ring up signal; and said satellite includes means responsive to a dial signal designating a particular called party, for delivering a corresponding ring up signal to all of said sectors of the earth.

2. The communication system described in claim 1 wherein:

said means for directing a narrow angle radio wave beam includes a matrix of feed horns positioned to direct signals to said large reflector, and a Butler matrix means connected to said ports and to said feed horns for applying signals of a controlled relative phase and amplitude to said horns in response to signals received from a particular port, to produce a narrow beam of predetermined direction from said reflector.

3. A communication system for establishing communications between a large number of earth based terminals by means of a satellite, comprising:

a satellite which includes a large reflector, an array of feed horns positioned to direct radio waves to and receive radio waves from said large reflector, a Butler matrix means coupled to said feed horns and having a plurality of signal ports, for applying signals of a controlled relative phase and amplitude to said horns corresponding to signals received in one of said ports to produce a narrow beam along a predetermined direction from said reflector, and for producing on a certain one of said ports an output signal originating from a particular location on the earth;

said satellite including means connected to said ports for demodulating the signal received from a first port, to obtain a limited signal lying in a channel of limited badwidth within said signal from said first port, and for combining said limited signal and other signals and delivering them to a predetermined one of said ports to produce a narrow beam for delivery to a particular sector of the earth;

said satellite also including means responsive to the particular horn from which an acknowledgement transmission is received from an earth based terminal, for selecting said predetermined one of said ports so it transmits to the same sector of the earth from which the acknowledgement transmission was received.

4. A method for establishing communication between any pair of a large number of earth based terminals by means of a satellite, comprising:

establishing in orbit a satellite with a large reflector and a plurality of signal processing means for receiving and transmitting radio waves, by reflection off the reflector, to and from primarily only a limited sector of the earth's surface, and with the sectors overlapping to cover a predetermined wide area of the earth;

delivering each of a plurality of signals, wherein each signal lies within a predetermined frequency channel of signals received from a particular one of said signal processing means, through a switching means to a modulator means, operating said modulator means to generate a signal within another predetermined frequency channel, and delivering said signal from said modulator means through a predetermined signal processing means for delivering by way of said reflector to a particular sector of the earth;

detecting dial signals defining a called party and broadcasting to all of said sectors a call up signal which activates an indicator on the earth based terminal which is defined by said dial signal;

transmitting an acknowledgement signal from the called party;

detecting the sectors from which said dial signal and acknowledgement signal originated; and operating said switching means to route signals in a particular frequency band that originate in the sector of the called party, so those signals are delivered by way of said modulator means and reflector to the sector of origination of the dial signal which defined that called party.

* * * * *